United States Patent
Lee et al.

(10) Patent No.: US 11,785,359 B2
(45) Date of Patent: *Oct. 10, 2023

(54) NAVIGATION DEVICE CAPABLE OF ESTIMATING CONTAMINATION AND DETERMINING UPDATE THRESHOLD

(71) Applicant: PixArt Imaging Inc., Hsin-Chu County (TW)

(72) Inventors: Joon-Chok Lee, Penang (MY); Kevin Len-Li Lim, Penang (MY)

(73) Assignee: PixArt Imaging Inc., Hsin-Chu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/097,207

(22) Filed: Jan. 14, 2023

(65) Prior Publication Data

US 2023/0179882 A1 Jun. 8, 2023

Related U.S. Application Data

(63) Continuation of application No. 17/408,733, filed on Aug. 23, 2021, now Pat. No. 11,582,413, which is a continuation of application No. 16/459,626, filed on Jul. 2, 2019, now Pat. No. 11,128,825.

(51) Int. Cl.
H04N 25/67 (2023.01)
G06F 3/0354 (2013.01)
G06T 5/20 (2006.01)

(52) U.S. Cl.
CPC ............ *H04N 25/67* (2023.01); *G06F 3/0354* (2013.01); *G06T 5/20* (2013.01)

(58) Field of Classification Search
CPC .......... H04N 5/365; G06F 3/0354; G06T 5/20
See application file for complete search history.

(56) References Cited

U.S. PATENT DOCUMENTS

2004/0001632 A1* 1/2004 Adachi ................ G06V 30/244
382/190

* cited by examiner

*Primary Examiner* — On S Mung
(74) *Attorney, Agent, or Firm* — BRUCE STONE LLP; Joseph A. Bruce

(57) ABSTRACT

There is provided an optical navigation device including an image sensor and a processing unit. The image sensor outputs successive image frames. The processing unit calculates a contamination level and a motion signal based on filtered image frames, and determines whether to update a fixed pattern noise (FPN) stored in a frame buffer according to a level of FPN subtraction, the calculated contamination level and the calculated motion signal to optimize the update of the fixed pattern noise.

20 Claims, 6 Drawing Sheets

| CL | THu=IS2/IS1 (%) |
|---|---|
| ≤80 | 14.8 |
| 81~160 | 19.2 |
| 161~200 | 21.2 |
| 201~320 | 25.6 |
| 321~640 | 31.6 |
| 641~1024 | 36 |

FIG. 3

NAVIGATION DEVICE CAPABLE OF ESTIMATING CONTAMINATION AND DETERMINING UPDATE THRESHOLD

CROSS REFERENCE TO RELATED APPLICATION

This application is a continuation application of U.S. application Ser. No. 17/408,733, filed on Aug. 23, 2021, which is a continuation application of U.S. application Ser. No. 16/459,626, filed on Jul. 2, 2019, the full disclosures of which are incorporated herein by reference.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an optical navigation device and, more particularly, to an optical navigation device and an operating method thereof that determine whether to update a fixed pattern noise (FPN) based on a contamination level in images, a level of FPN subtraction and a motion signal.

2. Description of the Related Art

It is known that the contamination e.g., particles or fingerprint on a lens or lens cover, can degrade the motion report of an optical navigation device such that accurate motion data may not be able to reported.

Traditionally, a fixed pattern noise can be constructed to be subtracted from an image frame to cancel out the influence from contamination that generally forms fixed noises in the image frame. However, if the fixed pattern noise is not constructed properly, not only the noises in a captured image frame caused by the contamination cannot be correctly eliminated, but the useful data in the captured image frame is also removed during the calculation such that cursor jitter may be induced even though the optical navigation device is stationary.

Accordingly, it is necessary to provide an optical navigation device that can build up a proper fixed pattern noise to efficiently eliminate the influence from contamination accumulated on a lens or lens cover.

SUMMARY

The present disclosure provides an optical navigation device and an operating method thereof that adopt an adaptive update threshold to optimize the update of the fixed pattern noise.

The present disclosure provides an optical navigation device capable of estimating contamination. The optical navigation device includes a processing unit configured to filter a received image frame using sum filtering and second derivative filtering to generate a filtered image frame, and calculate a contamination level using the filtered image frame. The contamination level is a counting number of a selected value in the filtered image frame generated in the second derivative filtering, and said selected value is a difference of 8 times of a center element of a 3×3 sum block generated after the sum filtering and the rest of eight elements of the 3×3 sum block, wherein a low contamination level indicates a high level of contamination, and a high contamination level indicates a low level of contamination.

The present disclosure further provides an optical navigation device including a frame buffer and a processing unit. The frame buffer is configured to store a fixed pattern noise. The processing unit is configured to filter a received image frame using sum filtering and second derivative filtering to generate a filtered image frame, calculate a contamination level using the filtered image frame, wherein the contamination level is a counting number of a selected value in the filtered image frame generated in the second derivative filtering, and said selected value is a summation of 4 directional filter elements in the second derivative filtering, and select an update threshold, corresponding to the calculated contamination level, configured to determine whether to update the fixed pattern noise in the frame buffer.

In the optical navigation device of the present disclosure, multiple update thresholds are previously determined and set in a look up table corresponding to multiple contamination levels. And one update threshold is selected corresponding to each image frame captured by the image sensor to prevent from being under-subtracted or over-subtracted by the fixed pattern noise during calculating the motion signal.

BRIEF DESCRIPTION OF THE DRAWINGS

Other objects, advantages, and novel features of the present disclosure will become more apparent from the following detailed description when taken in conjunction with the accompanying drawings.

FIG. 3 is a look up table indicating the relationship between contamination levels and update thresholds according to one embodiment of the present disclosure.

DETAILED DESCRIPTION OF THE EMBODIMENT

It should be noted that, wherever possible, the same reference numbers will be used throughout the drawings to refer to the same or like parts.

The optical navigation device of the present disclosure is to optimize the update of the stored fixed pattern noise (FPN) according to at least a contamination level as well as a denoised image frame and a pre-denoised image frame. In another embodiment, the optical navigation device further determines whether to update the stored fixed pattern noise according to a calculated motion signal. In the present disclosure, the contamination level is used to determine an update threshold, based on a look up table built up previously, to be compared with a ratio of frame summations between the denoised image frame and the pre-denoised image frame. In this way, the pre-denoised image frame is not under-subtracted or over-subtracted by the FPN (illustrated below by examples) and accurate motion data is reported.

Figure 1:
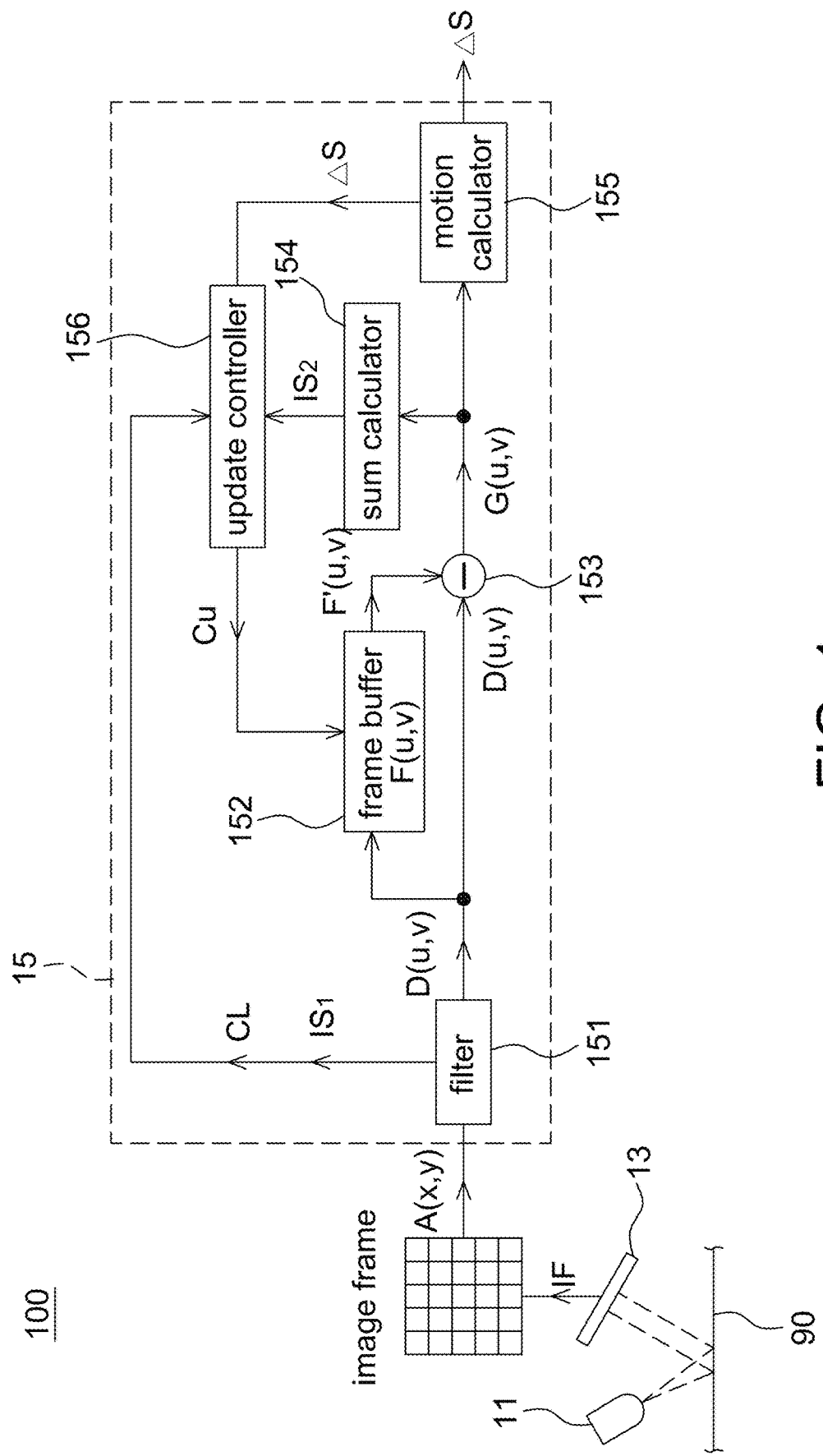
FIG. 1 is a schematic block diagram of an optical navigation device according to one embodiment of the present disclosure.

Referring to FIG. 1, it is a schematic block diagram of an optical navigation device 100 according to one embodiment of the present disclosure. The optical navigation device 100 is used to detect a relative movement with respect to a working surface 90 due to the motion of at least one of the optical navigation device 100 and the working surface 90. The optical navigation device 100 includes a light source 11, an image sensor 13 and a processing unit 15. The processing unit 15 is electrically connected to the light source 11 and the image sensor 13 to respectively control the lighting of the light source 11 and the image capturing of the image sensor 13.

The light source 11 emits light of an identifiable spectrum, e.g., infrared light, to illuminate the working surface 90, and is controlled by the processing unit 15 to emit light at a predetermined lighting pattern. The light source 11 is a coherent light source, a non-coherent light source or a partially coherent light source, e.g., a light emitting diode (LED) or a laser diode (LD).

The image sensor 13 is a charge coupled device (CCD) image sensor, a complementary metal oxide semiconductor (CMOS) sensor or the like, and has a pixel array used to capture reflected light from the working surface 90 and output an image frame A(x,y). The image frame A(x,y) is preferably a digital image frame. For example, the image sensor 13 further has an analog-to-digital converter (ADC) for converting analog raw data of every pixel into digital gray values, or the analog-to-digital converter is included in the processing unit 15 to perform the analog-to-digital conversion.

The processing unit 15 is a digital signal processor (DSP), a microcontroller unit (MCU) or an application specific integrated circuit (ASIC), and used to calculate and output a motion signal ΔS with respect to the working surface 90, wherein the motion signal ΔS herein is a denoised signal using a fixed pattern noise (FPN) constructed during operation, e.g., each time the optical navigation device 100 is powered on, in reacting to the accumulated contamination.

The processing unit 15 includes a digital filter 151, a frame buffer 152, a subtractor 153, a sum calculator 154, a motion calculator 155 and an update controller 156. It should be mentioned that although FIG. 1 shows that different function blocks of the processing unit 15 are separated from each other, all functions implemented by said different function blocks are considered to be implemented by the processing unit 15 using software and/or hardware. The frame buffer 152 is not limited to be arranged inside the processing unit 15 but an external memory device as long as it can be accessed by the processing unit 15.

Figure 2:
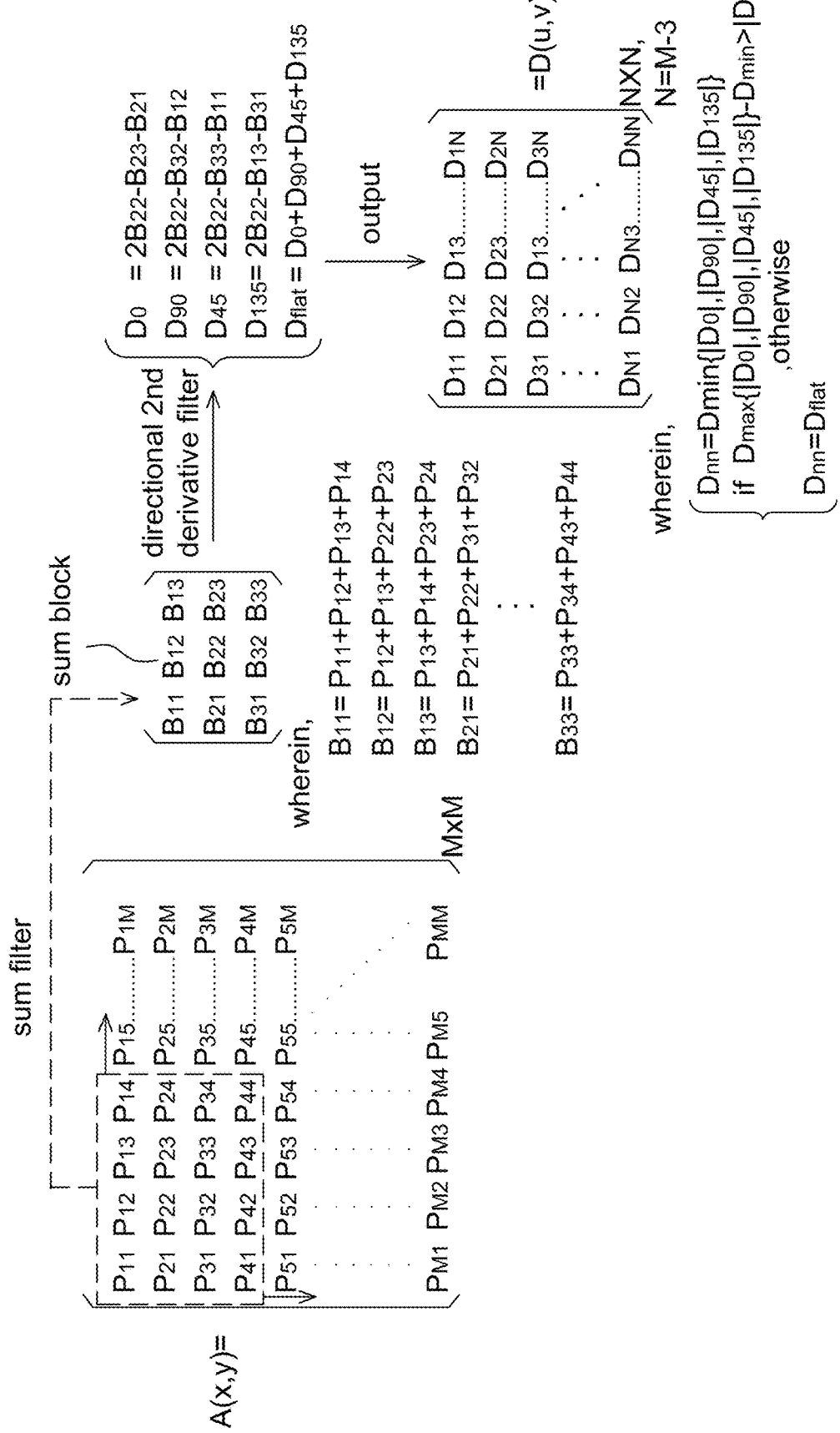
FIG. 2 is an operational schematic diagram of a digital filter of an optical navigation device according to one embodiment of the present disclosure.

Referring to FIG. 2, it is an operational schematic diagram of the digital filter 151 of the optical navigation device 100 according to one embodiment of the present disclosure.

In the present disclosure, the digital filter 151 filters an image frame A(x,y) to generate a filtered image frame D(x,y). In one non-limiting aspect, the digital filter 151 includes a sum filter and a second derivative filter. For example, FIG. 2 shows that an image frame A(x,y) outputted by the image sensor 13 has a size of M×M. A 2×2 sum filter is used to perform sum filtering on the whole image frame A(x,y) at first, i.e., totally (M−3)×(M−3) times of sum filtering being performed. The calculation of each element of the sum block is shown in FIG. 2 as an example.

After the sum filtering, a 3×3 second derivative filter is used to perform second derivative filtering on each sum block to generate a filtered image frame D(u,v), which has a size of (M−3)×(M−3). Each element Dnn of the filtered image frame D(u,v) is selected from two values $D_{min}$ and $D_{flat}$ as show in in FIG. 2. If $D_{max}-D_{min}>(|D_{flat}|>>2)$, $D_{min}$ is selected as Dnn; otherwise, $D_{flat}$ is selected. $|D_{flat}|>>2$ means right shifting $D_{flat}$ by 2 positions, which is equivalent to division of 4. $D_{flat}$ is the summation of 4 directional filter elements. After the division, $D_{flat}$ will be at the same scale as $D_{min}$ (1 directional filter element).

In the present disclosure, $D_{max}$=the maximum among $|D_0|$, $|D_{90}|$, $|D_{45}|$ and $|D_{135}|$ of one sum block; $D_{min}$=the minimum among $|D_0|$, $|D_{90}|$, $|D_{45}|$ and $|D_{135}|$ of the one sum block, and the calculation of $|D_0|$, $|D_{90}|$, $|D_{45}|$, $|D_{135}|$ and $|D_{flat}|$ is shown in FIG. 2 as an example. Each sum block calculated using the sum filtering obtains one element Dnn of the filtered image frame D(u,v).

The filtered image frame D(u,v) is used to update a fixed pattern noise F(u,v) stored in the frame buffer 152, and used to be subtracted by a pre-updated fixed pattern noise F'(u,v), wherein if the fixed pattern noise F(u,v) is not updated (illustrated below by an example) at one round, F(u,v)=F'(u,v). In one non-limiting embodiment, an initial fixed pattern noise stored in the frame buffer 152 is a null matrix, but not limited to. Each element of the initial fixed pattern noise is set as a predetermined value. It is appreciated that since a differential calculation is performed between the filtered image frame D(u,v) and the fixed pattern noise F(u,v), the fixed pattern noise F(u,v) is also a matrix having a size of (M−3)×(M−3).

In addition, the processing unit 15 further calculates a contamination level CL and a first frame summation $IS_1$ using the filtered image frame D(u,v). The first frame summation $IS_1$ is a sum of values of all elements of the filtered image frame D(u,v), e.g., $D_{11}+D_{12}+\ldots+D_{NN-1}+D_{NN}$. The contamination level CL is a counting number of a selected value in the filtered image frame D(u,v) generated by the second derivative filter, e.g., a number of times that $D_{flat}$ is selected in one filtered image frame D(u,v), and thus CL is smaller than or equivalent to $(M-3)^2$. The contamination level CL represents a level of contamination, where a lower CL means a higher level of contamination, and a higher CL means a lower level of contamination. This is because contamination such as fingerprint on an optical lens or lens cover can increase directional features, which in turn reduce the number of times that $D_{flat}$ is selected in one filtered image frame D(u,v).

Then, the processing unit 15 generates a denoised image frame G(u,v) using the fixed pattern noise F'(u,v) and the filtered image frame D(u,v), e.g., subtracting the fixed pattern noise F'(u,v) from the filtered image frame D(u,v) to generate the denoised image frame G(u,v). The subtraction is performed in an element-by-element manner, i.e., every element of the fixed pattern noise F(u,v) being subtracted from the corresponding element in the filtered image frame D(u,v). The denoised image frame G(u,v) is used to calculate a motion signal ΔS by the motion calculator 155 and calculate a second frame summation $IS_2$ by the sum calculator 154. The second frame summation $IS_2$ is a sum of values of all elements of the denoised image frame G(u,v), which is also a matrix having a size of (M−3)×(M−3).

The motion calculator 155 calculates a motion signal ΔS using a correlation or comparison between two successive denoised image frames G(u,v), wherein the calculation is known to the art and thus details thereof are not described herein. The motion signal ΔS herein includes at least one of a displacement, a moving speed and an acceleration of the optical navigation device 100 with respect to the working surface 90. The motion signal ΔS is sent to the update controller 156 for determining whether to update the stored fixed pattern noise F(u,v). The motion signal ΔS is further outputted to a display device (not shown) of a computer system for controlling, e.g., a cursor motion shown on a screen. The motion signal ΔS is further used to perform other controls such as page turning, zooming or the like, and not limited to controlling the cursor motion.

The update controller 156 determines whether to update the stored fixed pattern noise F(u,v) according to the second frame summation $IS_2$, the first frame summation $IS_1$ and the contamination level CL, and in other aspects further according to the motion signal ΔS. A ratio $IS_2/IS_1$ between the second frame summation $IS_2$ and the first frame summation $IS_1$ represents a level of FPN subtraction, where a lower ratio $IS_2/IS_1$ means a higher level of FPN subtraction, and a higher ratio $IS_2/IS_1$ means a lower level of FPN subtraction.

In one non-limiting aspect, the processing unit 15 firstly determines an update threshold THu, which is used to be compared with the ratio $IS_2/IS_1$ for determining whether to update the stored fixed pattern noise F(u,v), according to the contamination level CL. For example referring to FIG. 3, it is a look up table regarding the relationship between multiple contamination levels CL and multiple update thresholds THu previously set and stored in a memory of the processing unit 15. Once a current contamination level CL is obtained according to the filtered image frame D(u,v), the processing unit 15 selects a corresponding update threshold THu from the look up table.

Besides, the processing unit 15 further compares the calculated motion signal ΔS with a predetermined motion threshold to determine whether to update the stored fixed pattern noise F(u,v). In the present disclosure, the processing unit 15 does not update the stored fixed pattern noise F(u,v) when any one of the motion signal ΔS and the ratio $IS_2/IS_1$ is smaller than a corresponding threshold, i.e. the motion signal ΔS being smaller than the predetermined motion threshold and/or the ratio $IS_2/IS_1$ being smaller than the selected update threshold THu.

Once the update controller 156 determines that the stored fixed pattern noise F(u,v) should be updated, i.e., both the motion signal ΔS and the ratio $IS_2/IS_1$ being larger than the corresponding threshold, the update controller 156 sends a control signal Cu to the frame buffer 152 to update the stored fixed pattern noise F(u,v). In one non-limiting aspect, the processing unit 15 is configured to update the stored fixed pattern noise F(u,v) by calculating a weighted summation of the filtered image frame D(u,v) and the pre-updated fixed pattern noise F'(u,v). For example, F(u,v)=(D(u,v)/K)+(F'(u,v)×(K−1)/K) if F(u,v) is updated, wherein K is a positive integer and indicates a ratio or weight of the current D(u,v) being used to update F(u,v).

Figure 4:
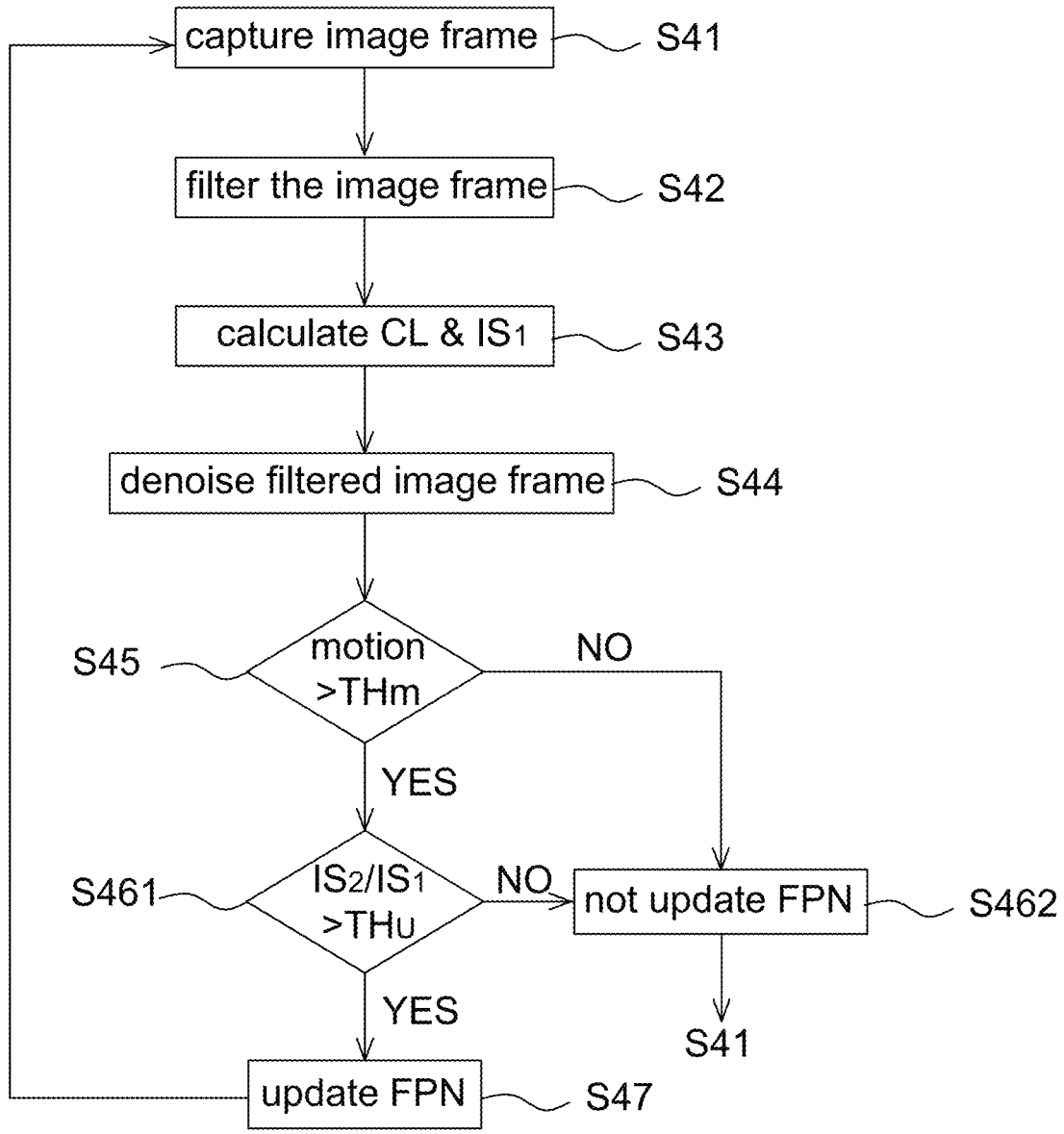
FIG. 4 is an operating method of an optical navigation device according to one embodiment of the present disclosure.

Referring to FIG. 4, it is a flow chart of an operating method of an optical navigation device according to one embodiment of the present disclosure, wherein the operating method is adaptable to the optical navigation device 100 in FIG. 1. Details of this embodiment are described below using an example.

Step S41: Firstly, the image sensor 13 captures an image frame A(x,y), which is sent to the processing unit 15, having a size of M×M. The image sensor 13 captures image frames A(x,y) at a frame rate and corresponding to the lighting of the light source 11.

Step S42: The digital filter 151 of the processing unit 15 filters the image frame A(x,y), for example, using sum filtering and second derivative filtering to generate a filtered image frame D(u,v) having a size of (M−3)×(M−3). As shown by an example in FIG. 2, the sum filtering is performed using a 2×2 sum filter, and the second derivative filtering is performed using a 3×3 second derivative filter.

Step S43: After the filtered image frame D(u,v) is generated, the processing unit 15 calculates a contamination level CL and a first frame summation $IS_1$ using the filtered image frame D(u,v). The processing unit 15 further determines an update threshold THu according to the calculated contamination level CL, e.g., based on a look up table shown in FIG. 3 or a predetermined relationship. The processing unit 15 calculates a sum of values of all elements of the filtered image frame D(u,v) as a first frame summation $IS_1$.

Step S44: The denoising of the filtered image frame D(u,v) is performed by, for example, subtracting a fixed pattern noise F(u,v), which is stored in the frame buffer 152, from the filtered image frame D(u,v) to generate a denoised image frame G(u,v). As mentioned above, the fixed pattern noise F(u,v) is a (M−3)×(M−3) matrix to have a same size with the filtered image frame D(u,v), and an initial fixed pattern noise originally (reset before the Step S41) stored in the frame buffer 152 is set as a null matrix.

The motion calculator 155 of the processing unit 15 calculates a motion signal ΔS, e.g., using correlation or comparison method, using successive denoised image frames G(u,v). The sum calculator 154 of the processing unit 15 calculates a second frame summation $IS_2$ of each denoised image frames G(u,v), wherein the second frame summation $IS_2$ is a sum of values of all elements of the denoised image frame G(u,v).

The update controller 156 of the processing unit 15 determines whether to update the stored fixed pattern noise F(u,v) according to the contamination level CL, the second frame summation $IS_2$ and the first frame summation $IS_1$ in Steps S46-S47, and in other aspects further according to the motion signal ΔS in the Step S45. That is, the step S45 is optional. It should be mentioned that in FIG. 4 a sequence of the Steps S45 and S461 is exchangeable.

Step 45: The processing unit 15 compares the calculated motion signal ΔS with a predetermined motion threshold THm (e.g., displacement threshold, speed threshold and/or acceleration threshold), which is determined according to, for example, the noise tolerance and sensitivity of the image sensor 13. If the motion signal ΔS exceeds (having motion big enough) the motion threshold THm, then the procedure enters the step S461. Otherwise, when the motion signal ΔS is smaller than the motion threshold THm, the processing unit 15 determines that the stored fixed pattern noise F(u,v) is not updated in this round (Step S462) and moves the operating procedure to the Step S41 to start another update round.

Step S461: The processing unit 15 then compares a ratio $IS_2/IS_1$ between the second frame summation $IS_2$ and the first frame summation $IS_1$ with the update threshold THu, which is selected according to the calculated contamination level CL when the optical navigation device 100 is under operation. If the ratio $IS_2/IS_1$ exceeds (e.g., larger than or equal to) the update threshold THu, the processing unit 15 updates the stored fixed pattern noise F(u,v) by calculating a weighted summation of the filtered image frame D(u,v) and the pre-updated fixed pattern noise F'(u,v) (Step S47). Otherwise, when the ratio $IS_2/IS_1$ is smaller than the update threshold THu, the processing unit 15 determines that the stored fixed pattern noise F(u,v) is not updated in this round (Step S462) and moves the operating procedure to the Step S41 to start another update round. If the update is not performed, F(u,v)=F'(u,v) and F(u,v) is subtracted from the filtered image frame D(u,v) in the next update round.

Finally, the operating procedure returns to the Step S41 to capture another image frame D(u,v) and start another update round.

In the present disclosure, the FPN update process is always running and it will stop only when the FPN is properly built up. This updating process is governed by steps S45 and S461 in FIG. 4 to avoid over or under FPN subtraction.

The stored fixed pattern noise F(u,v) is reset to its initial form next time before the optical processing unit 15 is used again. In some cases, the user triggers the update procedure shown in FIG. 4 via a user interface shown on a display device of a computer system or by pressing a predetermined button.

Figure 5:
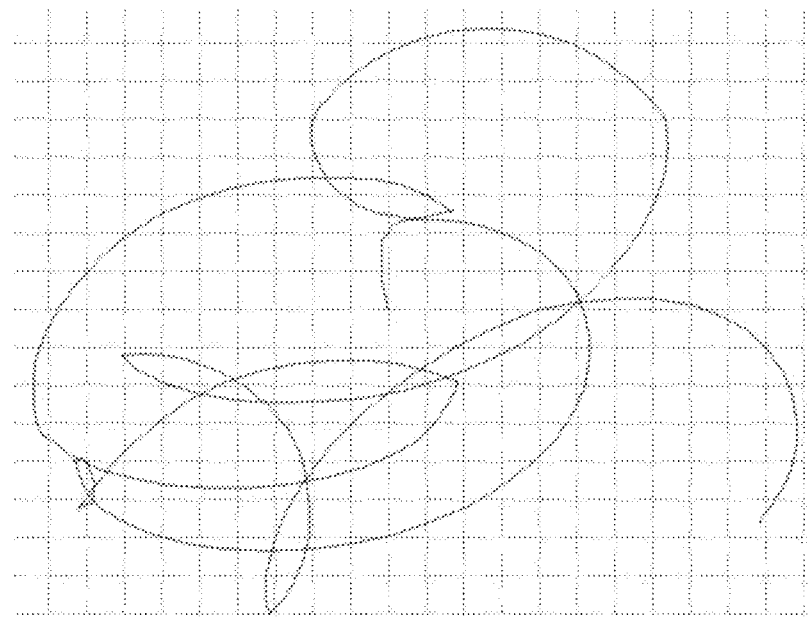
FIG. 5 is a schematic of an output track of an optical navigation device according to one embodiment of the present disclosure showing the filtered image frame is under-subtracted by FPN.

In the present disclosure, it is crucial to control the ratio $IS_2/IS_1$ at an optimum value. When the ratio $IS_2/IS_1$ is too high, image frame A(x,y) is under-subtracted for FPN. The optical navigation device 100 is not able to report accurate motion data because useful signal is overwhelmed by strong FPN. FIG. 5 shows a motion track shown on the display when the filtered image D(u,v) is under-subtracted by the fixed pattern noise.

Figure 6:
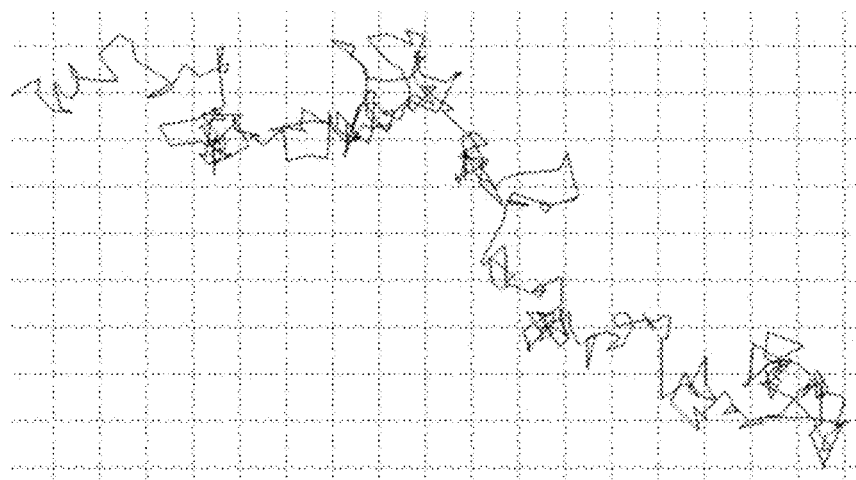
FIG. 6 is a schematic of an output track of an optical navigation device according to one embodiment of the present disclosure showing the filtered image frame is over-subtracted by FPN.
Figure 7:
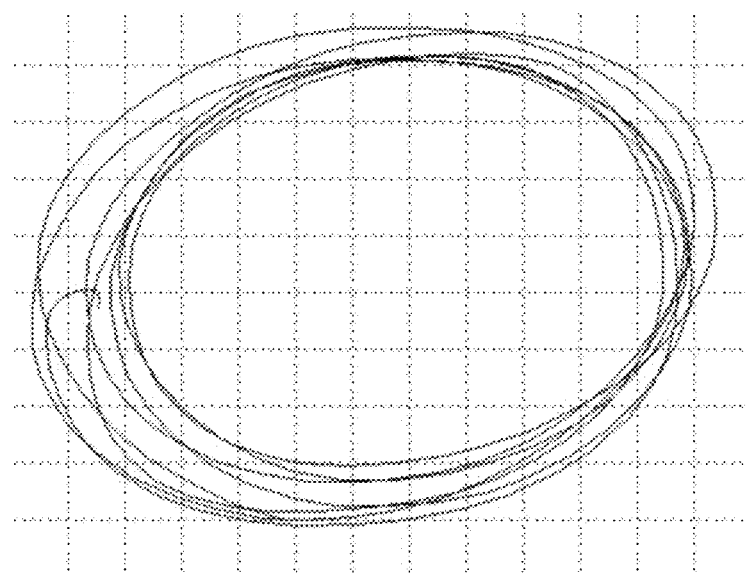
FIG. 7 is a schematic of an output track of an optical navigation device according to one embodiment of the present disclosure showing the filtered image frame is properly subtracted by FPN.

On the other hand, when the ratio $IS_2/IS_1$ is too low, image frame A(x,y) is over-subtracted for FPN. This means that useful signal that provides motion data is also subtracted to cause the optical navigation device 100 to report invalid motion data (e.g., cursor shown on the display device being jittery) even while the optical navigation device 100 is stationary. This is result of performing correlation on denoised image frames G(u,v) with very poor signal to noise ratio. FIG. 6 shows a motion track shown on the display device when the filtered image D(u,v) is over-subtracted by the fixed pattern noise. FIG. 7 shows a motion track shown on the display device when the filtered image D(u,v) is properly subtracted by the fixed pattern noise. FIGS. 5-7 show cursor motion on the display device with the optical navigation device 100 being operated to form circular motion.

It should be mentioned that values, e.g., CL, THu, frame rate and K mentioned in the above embodiments are only intended to illustrate but not to limit the present disclosure.

As mentioned above, it is crucial to determine a proper fixed pattern noise for obtaining an accurate motion report. Accordingly, the present disclosure provides an optical navigation device (e.g., FIG. 1) and an operating method thereof (e.g., FIG. 4) that determine whether to update a fixed pattern noise stored in a frame buffer according to a contamination level of a captured image frame to optimize the update of the fixed pattern noise thereby reporting accurate motion.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical navigation device, capable of estimating contamination, the optical navigation device comprising:
   a processing unit, configured to
      filter a received image frame using sum filtering and second derivative filtering to generate a filtered image frame, and
      calculate a contamination level using the filtered image frame, wherein
   the contamination level is a counting number of a selected value in the filtered image frame generated in the second derivative filtering, and said selected value is a difference of 8 times of a center element of a 3×3 sum block generated after the sum filtering and the rest of eight elements of the 3×3 sum block, and
   a low contamination level indicates a high level of contamination, and a high contamination level indicates a low level of contamination.

2. The optical navigation device as claimed in claim 1, wherein the processing unit is configured to
   perform the sum filtering using a 2×2 sum filter, and
   perform the second derivative filtering using the 3×3 sum block.

3. The optical navigation device as claimed in claim 2, wherein
   a size of the image frame is M×M, and
   a size of the filtered image frame is (M−3)×(M−3).

4. The optical navigation device as claimed in claim 3, further comprising a frame buffer configured to store a fixed pattern noise, which is a (M−3)×(M−3) matrix, wherein an initial fixed pattern noise stored in the frame buffer is a null matrix.

5. The optical navigation device as claimed in claim 4, wherein the processing unit is configured to update the stored fixed pattern noise by calculating a weighted summation of the filtered image frame and the stored fixed pattern noise.

6. The optical navigation device as claimed in claim 4, wherein the processing unit is further configured to
   determine an update threshold according to the contamination level,
   generate a denoised image frame by subtracting the stored fixed pattern noise from the filtered image frame,
   calculate a first frame summation using the filtered image frame,
   calculate a second frame summation using the denoised image frame, and
   compare a ratio between the second frame summation and the first frame summation with the update threshold.

7. The optical navigation device as claimed in claim 6, wherein the processing unit is further configured to
   calculate a motion signal using the denoised image frame, and
   determine whether to update the stored fixed pattern noise further by comparing the motion signal with a predetermined motion threshold.

8. The optical navigation device as claimed in claim 7, wherein the processing unit is configured not to update the stored fixed pattern noise when any one of the motion signal and the ratio is smaller than the corresponding threshold.

9. The optical navigation device as claimed in claim 6, wherein
   the first frame summation is a sum of values of all elements of the filtered image frame; and the second frame summation is a sum of values of all elements of the denoised image frame.

10. The optical navigation device as claimed in claim 7, wherein the motion signal includes at least one of a displacement, a moving speed and an acceleration of the optical navigation device.

11. An optical navigation device, comprising:
a frame buffer, configured to store a fixed pattern noise; and
a processing unit, configured to
filter a received image frame using sum filtering and second derivative filtering to generate a filtered image frame,
calculate a contamination level using the filtered image frame, wherein the contamination level is a counting number of a selected value in the filtered image frame generated in the second derivative filtering, and said selected value is a summation of 4 directional filter elements in the second derivative filtering, and
select an update threshold, corresponding to the calculated contamination level, configured to determine whether to update the fixed pattern noise in the frame buffer.

12. The optical navigation device as claimed in claim 11, wherein the processing unit is configured to
perform the sum filtering using a 2×2 sum filter, and
perform the second derivative filtering using a 3×3 second derivative filter.

13. The optical navigation device as claimed in claim 12, wherein
a size of the image frame is M×M, and
a size of the filtered image frame is (M−3)×(M−3).

14. The optical navigation device as claimed in claim 13, wherein the fixed pattern noise is a (M−3)×(M−3) matrix, and an initial fixed pattern noise stored in the frame buffer is a null matrix.

15. The optical navigation device as claimed in claim 11, wherein the processing unit is configured to update the stored fixed pattern noise by calculating a weighted summation of the filtered image frame and the stored fixed pattern noise.

16. The optical navigation device as claimed in claim 11, wherein the processing unit is further configured to
calculate a first frame summation using the filtered image frame,
calculate a second frame summation using a denoised image frame, which is generated by subtracting the stored fixed pattern noise from the filtered image frame, and
compare a ratio between the second frame summation and the first frame summation with the selected update threshold.

17. The optical navigation device as claimed in claim 16, wherein the processing unit is further configured to
calculate a motion signal using the denoised image frame, and
determine whether to update the stored fixed pattern noise further by comparing the motion signal with a predetermined motion threshold.

18. The optical navigation device as claimed in claim 17, wherein the processing unit is configured not to update the stored fixed pattern noise when any one of the motion signal and the ratio is smaller than the corresponding threshold.

19. The optical navigation device as claimed in claim 16, wherein
the first frame summation is a sum of values of all elements of the filtered image frame; and
the second frame summation is a sum of values of all elements of the denoised image frame.

20. The optical navigation device as claimed in claim 17, wherein the motion signal includes at least one of a displacement, a moving speed and an acceleration of the optical navigation device.

* * * * *